April 13, 1965 C. D. SKIRVIN 3,178,609

STABILIZED TWO-TRANSISTOR FLASHER CIRCUIT

Filed May 6, 1963

INVENTOR.
CLIFFORD D. SKIRVIN
BY
White & Haefliger
ATTORNEYS.

United States Patent Office
3,178,609
Patented Apr. 13, 1965

3,178,609

STABILIZED TWO-TRANSISTOR FLASHER CIRCUIT

Clifford D. Skirvin, Pomona, Calif., assignor, by mesne assignments, to Microdot, Inc., Pasadena, Calif., a corporation of California Filed May 6, 1963, Ser. No. 278,088
1 Claim. (Cl. 315—206)

This invention relates generally to solid state pulse generators of the type particularly applicable for energizing flasher lights used to mark road repairs and such. More particularly, the invention relates to a stabilized transistor flasher circuit, operable over a wide temperature range and of a low power consumption.

Circuits of this type generally have the disadvantage of either requiring excessive current or of being operable only over narrow temperature ranges. Typically, such circuits would draw current in the region of 25 milliamperes and would cease operating properly at temperatures near 110° F. Also, such circuits frequently draw small amounts of leakage current, in the region of 3 milliamperes during the off time.

A major object of this invention is to provide a transistorized flasher circuit which will generate electrical pulses of very short duration so as to draw a low amount of current, typically in the region of 12 milliamperes average, while the pulses are being generated and to draw no current during the off time when the pulses are not being generated. It is also a major object of this invention to provide a stabilized circuit which will perform properly at temperatures up to 160° F.

A further object of the invention is to provide a novel circuit which is efficient and reliable in operation and economical to assemble.

Another object of the invention is to provide a novel circuit wherein the length of the pulses and the time interval between successive pulses can be easily controlled.

As broadly considered, the network for controlling the flasher includes a pair of transistors each having conducting and non-conducting states, the state of the first transistor controlling energization of the flasher and the state of the second transistor controlling the state of the first transistor. The network also includes means responsive to a change of state of the first transistor to change the state of the second transistor after predetermined time delay, there also being voltage dividing resistance providing transistor input voltage levels acting to stabilize the transistors in non-conducting state during the time delay interval before the second transistor state is changed to conducting by said means.

More specifically, the transistor biasing voltage dividing resistance is interconnected between the terminals of the direct current source and has intermediate points connected to the base electrode of the first transistor and to the collector and base electrodes of the second transistor. Also, the circuit typically comprises a first transistor of PNP type and a second transistor of NPN type interconnected in a novel manner wherein the emitter of the transistor is biased at the positive potential of the direct current source and the emitter of the second transistor is biased at the negative potential of the source. Finally, the circuit features feedback means comprising novel arrangements of resistance and capacitance and interconnecting the collector electrode of the first transistor and the base electrode of the second transistor for determining the pulse length and pulse frequency of the circuit.

These and other objects and features of the invention will be more clearly understood from the following detailed description of a typical embodiment of which:

Figure 1:
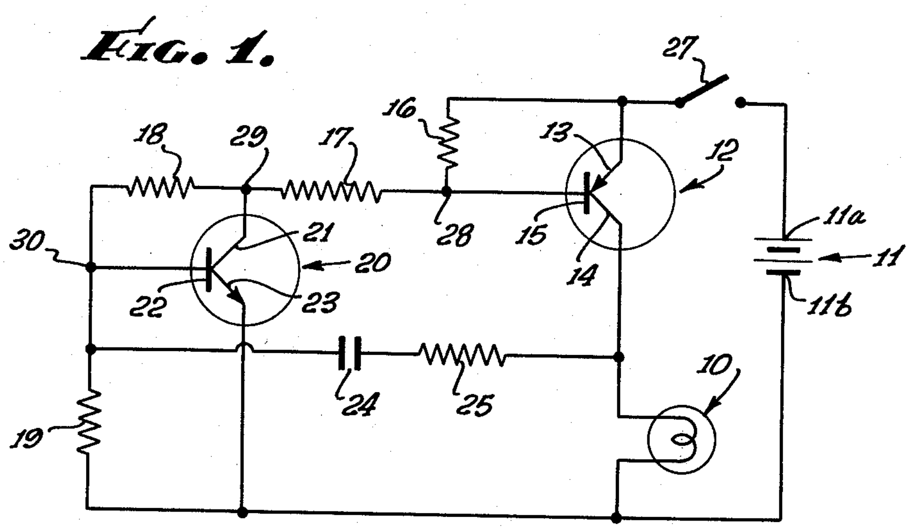
FIG. 1 is a typical circuit arrangement.

Referring first to the circuit of FIG. 1, element 10 is a load or flasher lamp which is to be alternately energized and de-energized. Element 11 is a direct current source, typically a battery, having a positive terminal 11*a* and a negative terminal 11*b*, which supplies the current for energizing the load 10. Transistor 12 illustrated as of PNP type, has its emitter electrode 13 connected directly to the positive terminal 11*a* of the direct current source 11 and its collector electrode 14 connected to the negative terminal 11*b* of the direct current source 11 through the load 10.

Transistor 20 illustrated as of NPN type has its emitter electrode 23 connected directly to the negative electrode 11*b* of the direct current source 11 and its collector electrode 21 connected to the base electrode 15 of transistor 12 through resistor 17.

Stabilizing bias for the transistors is typically provided by a voltage dividing means comprising resistors 16, 17, 18 and 19 connected between the terminals 11*a* and 11*b* of the direct current source 11. Intermediate points 28, 29 and 30 on the voltage dividing means are connected respectively to the base electrode 15 of transistor 12, the collector electrode 21 of transistor 20 and the base electrode 22 of transistor 20. A feedback circuit comprising a capacitor 24 and a resistor 25 is connected between the collector electrode 14 of transistor 12 and the base electrode 22 of transistor 20. A switch 27 is typically interconnected in series with the direct current source 11 for energizing and de-energizing the entire circuit.

The operation of the FIG. 1 circuit is as follows. At the moment the switch 27 is closed, neither transistor is conducting and current flows from the direct current source 11 through the voltage dividing means, biasing transistor 20 such that it begins to conduct. When collector current in transistor 20 begins to flow, the bias on the base electrode 15 of transistor 12 is altered in such manner that it begins to conduct and passes current from the source through its collector and emitter electrodes to the load 10. The current flowing from transistor 12 to the load 10 also charges the capacitor 24.

When the capacitor 24 has been charged to a predetermined value, the bias on the base electrode 22 of transistor 20 is altered such that the transistor ceases to conduct. As the transistor 20 ceases to conduct, its collector current decreases thus altering the bias on the base electrode 15 of transistor 12 causing it to cease conducting, and thus de-energizing the load 10. The charge on capacitor 24 then dissipates through the resistors 19 and 25 and the load 10, until the bias at the base electrode 22 of the transistor 20 is altered to the point where conduction again occurs and the entire cycle repeats. Thus, it is seen that transistor 20 in effect turns on transistor 12, which then energizes the load 10 and turns off transistor 20 causing transistor 12 to be turned off. The time that transistor 12 is conducting determines the length of the energizing pulse and the time that it is not conducting determines the frequency of the pulses. The conducting and non-conducting time of transistor 12 is in turn determined largely by the RC time constant of the feedback circuit, thus by simply varying the resistance and capacitance in the feedback circuit the pulse length and frequency can be altered over a wide range. In this regard, the voltage dividing means provides transistor input voltage levels which stabilize the transistors in non-conducting state during the time delay interval before the state of transistor 20 is changed to conducting.

Figure 2:
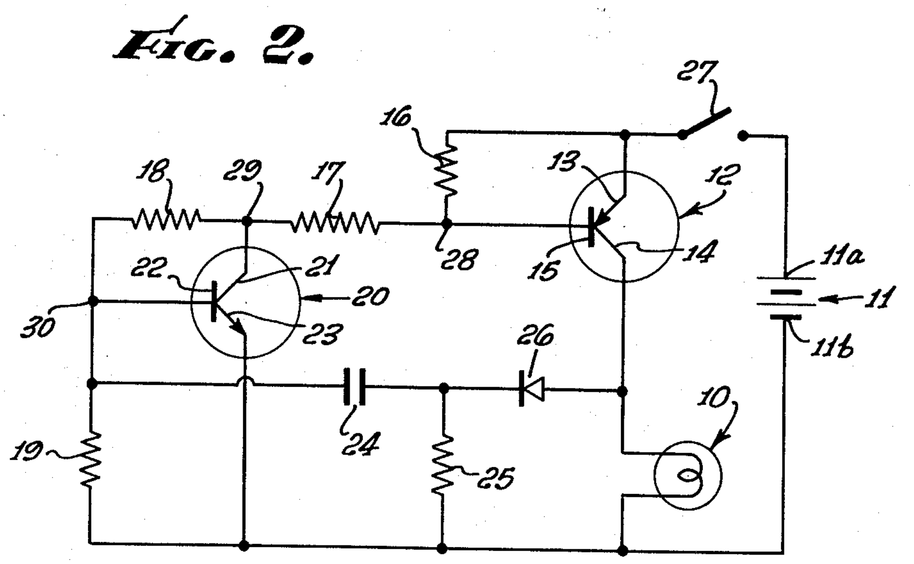
FIG. 2 is an alternate arrangement.

Referring now to FIG. 2, it is seen that resistor 25 has been placed in parallel with capacitor 24 rather than in series with it, and an additional unidirectional circuit element 26, typically a diode, has been placed in series with capacitor 24. This variation of the circuit provides pulses of shorter duration than the circuit of FIG. 1. A typical pulse time of the circuit in FIG. 2 would be on the order of 50 milliseconds, whereas the pulse time of the circuit of FIG. 1 would be 10 milliseconds. The operation of the circuit in FIG. 2 is substantially identical with the operation of the circuit in FIG. 1, except that in FIG. 2 the charge on capacitor 24 dissipates through resistors 19 and 25 only.

The values of the resistances in the voltage dividing means have been chosen such that during the time transistor 12 is not conducting no leakage current flows therethrough to the load 10.

I have set up and successfully operated the circuits of the present invention with the following values and characteristics for the components illustrated. It should be clearly understood, however, that these values are illustrative only:

| | (Example 1) | (Example 2) |
|---|---|---|
| Fig. 1 circuit: | | |
| Load or lamp 10 | GE #1850 | GE #1408 & 1404. |
| Direct current source 11 | 6VDC | 12VDC. |
| Transistor 12 | 2N1303 | 2N1303. |
| Transistor 20 | 2N1302 | 2N1302. |
| Resistors: | | |
| 16 | 1,000 ohm | 2,200 ohm. |
| 17 | 680 ohm | 1,200 ohm. |
| 18 | 150,000 ohm | 270,000 ohm. |
| 19 | 5,600 ohm | 8,200 ohm. |
| 25 | 220 ohm | 470 ohm. |
| Capacitor 24 | 20 ufd | 25 ufd. |
| Fig. 2 circuit: | | |
| Load or lamp 10 | GE #1850 | GE #1404. |
| Direct current source 11 | 6 volts | 12 volts. |
| Transistor 12 | 2N1303 | 2N1303. |
| Transistor 20 | 2N1302 | 2N1302. |
| Resistors: | | |
| 16 | 1,000 ohm | 2,200 ohm. |
| 17 | 470 ohm | 820 ohm. |
| 18 | 270,000 ohm | 560,000 ohm. |
| 19 | 8,200 ohm | 10,000 ohm. |
| 25 | 10,000 ohm | 18,000 ohm. |
| Capacitor 24 | 10 ufd | 10 ufd. |
| Diode 26 | Silicon | Silicon. |

I claim:

In a stabilized transistor flasher circuit: a direct current source having a positive terminal and a negative terminal, a flasher load having terminals, a first transistor having its collector and emitter electrodes connected in series with said load and said direct current source, a second transistor having its emitter connected directly to said negative terminal of said direct current source, a first capacitor interconnecting the collector of said first transistor with the base of said second transistor, a first impedance, a unidirectionally conductive element in series with said capacitor, a second impedance interconnecting the emitter of said first transistor with the base of said first transistor, a third impedance interconnecting the base of said first transistor with the collector of said second transistor, a fourth impedance interconnecting the collector of said second transistor with the base of said second transistor, a fifth impedance interconnecting the base of said second transistor with said negative terminal of said direct current source, the unidirectional conductive element and first impedance being connected in series and directly across the load terminals, said impedances, unidirectionally conductive element, and capacitor being operable upon circuit turn-on to bias said second transistor to conduction, thereby biasing said first transistor to conduction for energizing said load, said capacitor then being charged by the collector current of said first transistor for biasing said second transistor to cutoff which causes said first transistor to be biased to cutoff thereby de-energizing said load and discharging said capacitor.

References Cited by the Examiner

UNITED STATES PATENTS

| | | | |
|---|---|---|---|
| 2,901,669 | 8/59 | Coleman | 331—111 |
| 3,018,473 | 1/62 | Rodgers | 331—111 |
| 3,046,494 | 7/62 | Root | 331—111 |

FOREIGN PATENTS

| | | |
|---|---|---|
| 801,453 | 9/58 | Great Britain. |
| 1,247,675 | 10/60 | France. |

JOHN KOMINSKI, *Primary Examiner.*